United States Patent [19]

Bernard

[11] Patent Number: 4,633,551
[45] Date of Patent: Jan. 6, 1987

[54] METHOD OF CONTINUOUS FABRICATION OF MOTHER-CAPACITORS

[75] Inventor: Daniel Bernard, Seurre, France

[73] Assignee: LCC.CICE-Compagnie Europeenne de Composants Electroniques, Bagnolet, France

[21] Appl. No.: 627,836

[22] Filed: Jul. 5, 1984

[30] Foreign Application Priority Data

Jul. 6, 1983 [FR] France ................. 83 11259

[51] Int. Cl.⁴ .................................................. H01G 4/32
[52] U.S. Cl. ..................................... 29/25.42; 242/56.1
[58] Field of Search ............................ 29/25.42, 423; 242/56.1

[56] References Cited

U.S. PATENT DOCUMENTS 3,670,378  6/1972  Behn et al. ................. 29/25.42
4,229,865 10/1982  Fanning ..................... 29/25.42
4,488,340 12/1984  Rayburn ..................... 29/25.42

FOREIGN PATENT DOCUMENTS 2824802 12/1979 Fed. Rep. of Germany .

Primary Examiner—Carl E. Hall
Attorney, Agent, or Firm—Oblon, Fisher, Spivak, McClelland & Maier

[57] ABSTRACT

In a method of continuous fabrication of mother-capacitors, a mother-film of substantial width is first metallized and cut so as to form intermediate films. A border is then formed on each intermediate film by means of a YAG-laser beam. Each intermediate film is then cut so as to form individual films by means of a $CO_2$-laser beam, the beam spot being located in proximity to the YAG-laser beam spot on the intermediate film. After relative displacement of the individual films, they are wound on a wheel of substantial width so as to form an array of n mother-capacitors. A single intercalary element is placed between two tiers of an assembly of m mother-capacitors, thus endowing the assembly with good stability. The two outer rings of mother-capacitors are finally cut-out after spray-coating.

4 Claims, 17 Drawing Figures

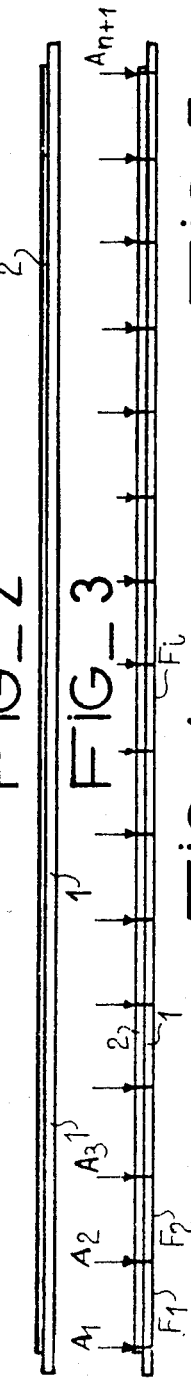
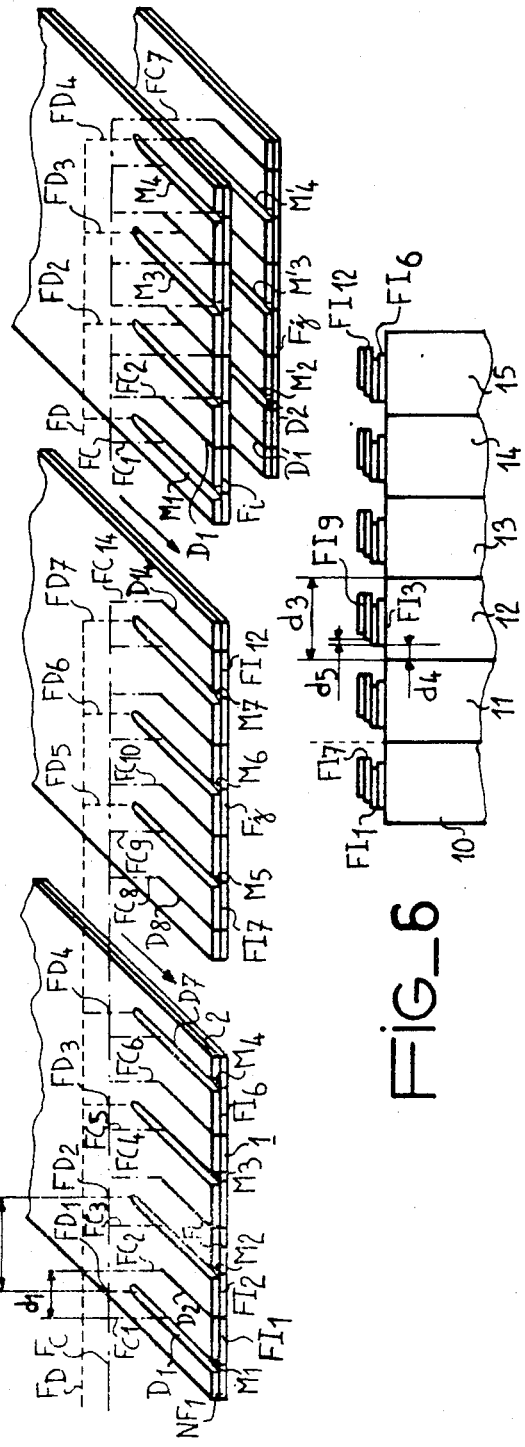
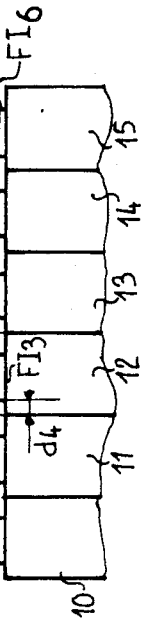

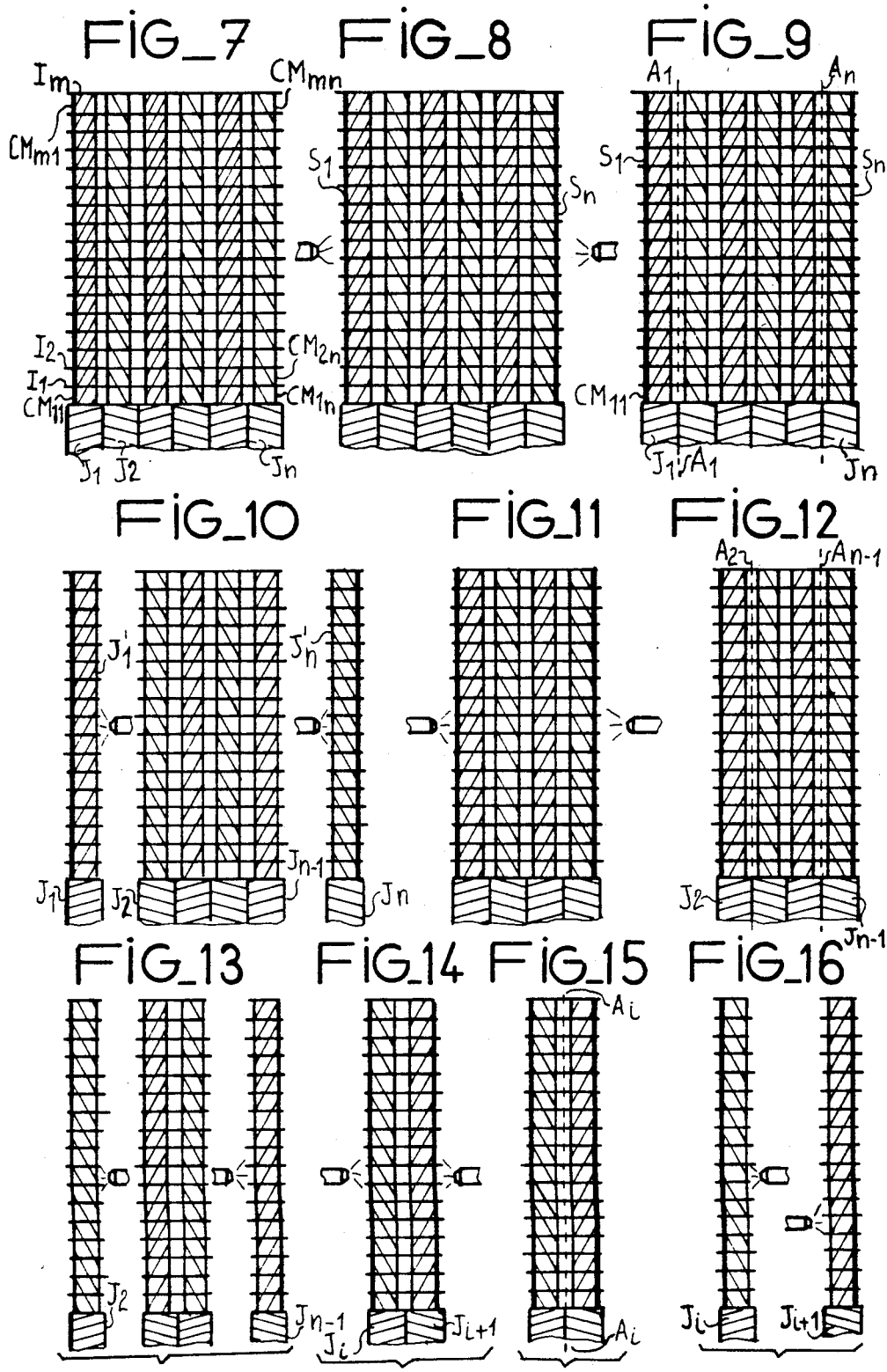

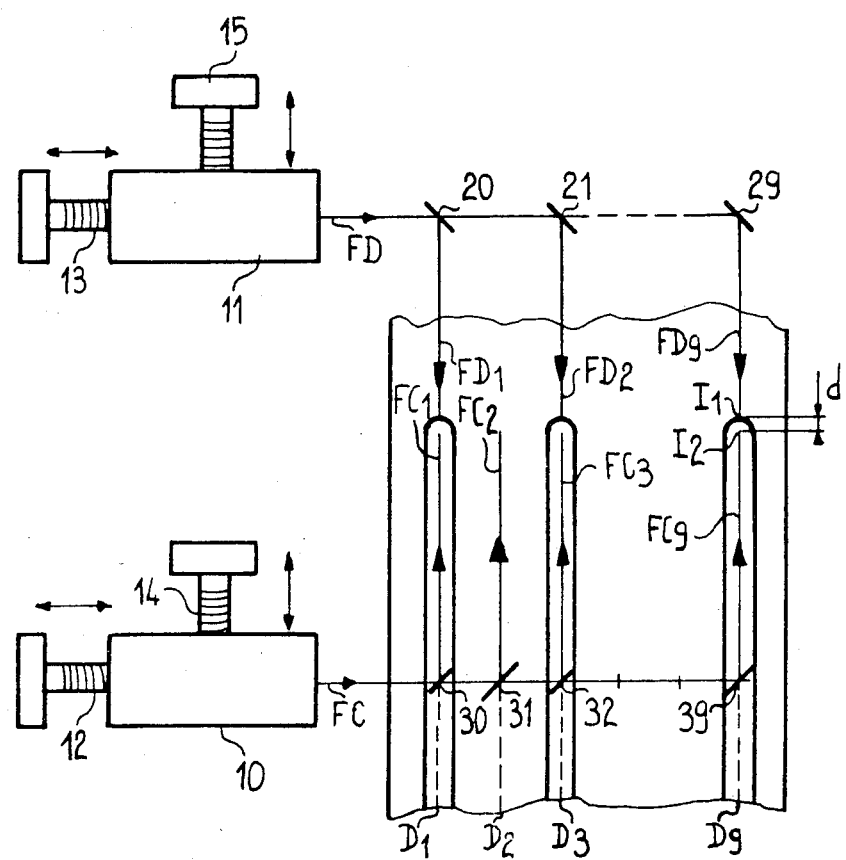
FIG_17

METHOD OF CONTINUOUS FABRICATION OF MOTHER-CAPACITORS

BACKGROUND OF THE INVENTION

1. Field of the Invention

This invention relates to a method of continuous fabrication of mother-capacitors.

2. Description of the Prior Art

A mother-capacitor is the term used to designate a capacitor in the form of a parallelepipedal bar, the side faces of which are spray-coated by the Schoop process. The bar is obtained from a metallized plastic film arranged in a flat stack or wound on a wheel of large diameter. A large number of individual capacitors are fabricated from this capacitor by cutting this latter at right angles to the spray-coated side faces. Different methods for the fabrication of mother-capacitors of the type mentioned above are described for example in French patents Nos. 879,280, 903,040, 1,051,464, 1,051,465 and 2,011,553.

In order to achieve a sufficiently high standard of quality and production efficiency, this technology entails the need to form the winding from metallized film of identical width with a very high degree of accuracy. Furthermore, the development of miniaturized capacitors makes it necessary to ensure that these widths of metallized film are of low value, namely of the order of 5 mm. In consequence, the non-metallized borders of these films must also be of small width in order to avoid any reduction in capacitance of the capacitors thus formed.

Finally, the heights attained by metallized film having widths of this order, whether stacked or wound on a wheel of large diameter, do not permit high production efficiency by reason of the fact that any increase in height is attended by a not-negligible danger of collapse of the mother-capacitor.

These different requirements lead to the conclusion that they cannot all be satisfied at the same time by the known methods at present in use. In point of fact, the metallization of films and formation of non-metallized borders on these films (by means of techniques which are well-known to those versed in the art such as a movable mask or oil mask) are carried out in a metallization unit whereas the operations involved in cutting and rewinding of strips in the form of thick disks are carried out in a cutting unit. Experience has shown that films of identical width with a narrow border can be obtained simultaneously only with very great difficulty. In order to achieve such a result, it would be necessary in the first place to obtain a perfect match between the positioning of the border-forming tools in the metallization unit and positioning of the cutting tools in the cutting unit. In the second place, it would be necessary to ensure perfect dimensional stability of the dielectric during these different operations performed under mechanical and/or thermal stress. It is found in particular that, in the case of fixed cutting knives, it is necessary to exert a tractive effort on the bordered films in order that the knives may cut in said borders with varying degrees of success (as the total width of the film increases, so the problems become more numerous).

Since these two requirements are not satisfied in practice, utilizable films can be obtained only at the cost of certain sacrifices from a productivity standpoint, viz:

the total width of film at the level of the metallization is reduced in order to avoid accumulation of mechanical errors in the tolerances of positioning of the border-forming and cutting tools at the level of the stack;

the tolerance allowed on the width of films is established first in order of priority and the minimum width of the non-metallized borders is deduced therefrom. In other words, the width of the borders may exceed the minimum value, thus inducing a loss of capacitance at the level of the capacitor thus formed (or a greater volume in respect of a given capacitance.

In all cases, the mother-capacitors formed by stacking or winding on a wheel of large diameter are fabricated from films which have previously been wound in the form of thick disks. In the case of narrow film widths (of the order of 5 mm), the maximum possible diameter of said thick disks is very lixited since it is soon found that there is a considerable risk of "telescoping" or collapse of the disks. In consequence, production rates decrease as a function of the frequency with which said thick disks are changed.

SUMMARY OF THE INVENTION

The method in accordance with the invention makes it possible to overcome the disadvantages attached to methods of the prior art. With this objective, the method comprises the following steps:

(a) a mother-film of metallized plastic material is formed on at least one face of the film (but preferably on one face alone) without any borders;

(b) the metallized mother-film is cut approximately and in a manner known per se so as to form a plurality of intermediate metallized films;

(c) partial demetallization of each intermediate film is carried out by displacing said film in front of a YAG-laser beam divided into a plurality of secondary beams; this movement is performed in such a manner as to obtain a plurality of non-metallized borders having the same width and substantially parallel to the edges of the intermediate film, the distance between said borders being of equal and predetermined value;

(d) each intermediate film is cut so as to form individual films having a non-metallized border and a metallized portion of predetermined width;

(e) the individual films are moved away from each other to a predetermined distance ;

(f) n mother-capacitors are formed in juxtaposed relation by winding on a wheel of large diameter in a manner known per se, each mother-capacitor being formed by means of two individual films prepared in accordance with the above steps a to e but with a non-metallized border located on their opposite lateral edges;

(g) an intercalary element is deposited on each of the n mother-capacitors thus formed;

(h) there is deposited on each intercalary element a fresh mcther-capacitor whose edges are substantially aligned with those of the preceding tier;

(i) m tiers of mother-capacitors are thus formed in succession;

(j) the side faces of each assembly of m tiers of mother-capacitors are spray-coated by the Schoop process;

(k) the mother-capacitors are separated from each other in a manner known per se.

The cutting step can be carried out in this case by making use of known means such as the knives considered earlier on condition that these cutting xeans or knives are positioned in the immediate vicinity of the demetallization laser-beam spot, thus avoiding the problems mentioned above.

Preferably, the step d which consists in cutting the intermediate film so as to form n individual films will be carried out by xeans of a $CO_2$-laser beam subdivided into individual beams positioned with respect to the YAG-laser beams in such a manner as to obtain n individual films each having a border of the desired width, the demetallization and cutting spots on the intermediate film being located close together.

A particularly advantageous mode of execution of the method in accordance with the invention consists in employing in steps g, h and i only a single intercalary element for each of the m tiers of mother-capacitors, this intercalary element being common to the n mother-capacitors of the tier. In this case, after obtaining $n \times m$ mother-capacitors on the support, the two apparent side faces of this assembly are both spray-coated at the same time. Two successive stacks of n mother-capacitors are then separated parallel to said spray-coated side faces so as to form two assemblies of mother-capacitors having one side face provided with a xetallization coating formed by the Schoop process and one non-coated side face. The other side face of each assembly is then coated by spraying with a Schoop gun. Finally, the two preceding steps of cutting and spray-coating are repeated if necessary in order to obtain n assemblies of m mother-capacitors in which both side faces have been spray-coated.

Another particularly advantageous alternative embodiment of the invention consists in forming by means of each subdivided YAG-laser beam a demetallized border which is common to two successive individual films of the same intermediate film and in cutting by means of the $CO_2$ laser beam substantially at the center of said border and between two successive borders. Two metallized and bordered films are thus formed by making use of only one demetallization laser beam (in this case the beam forms a border having double the width). Depending on requirements and as will hereinafter be explained in greater detail, the number of demetallizing beams with respect to the number of cutting beams can be divided approximately by two (to within the nearest unit).

Another advantageous alternative embodiment consists in superposing two intermediate films (or more than two, depending on the power output of the laser beams employed), then in demetallizing and cutting said intermediate films by means of a single series of laser beams. The number of beams employed is again divided substantially by two and (at least) by four by making use of the two last-mentioned embodixents simultaneously.

Firstly in regard to the characteristics of the YAG-laser beam employed for correctly demetallizing a metallized dielectric film such as a film of ethylene polyterephthalate metallized with aluminum, and secondly in regard to the characteristics of the apparatus which makes use of this laser beam in order to produce a plurality of beams for simultaneous demetallization of one or a number of films, relevant information can be found more particularly in French patent No. 2,445,600, the disclosure of which is incorporated by reference herein.

In regard to the characteristics of laser beams employed for cutting material such as a polyester film, useful information will be found, for example, in the review entitled "Zeitschrift für angewandte mathematik und physik" vol. 16—1965—pages 138 to 145 or in any technical literature pertaining to this known field.

BRIEF DESCRIPTION OF THE DRAWINGS

Other features of the invention will be more apparent to those versed in the art upon consideration of the following description and accompanying drawings, wherein:

FIGS. 1 to 3 are schematic views showing the metallization of a mother-film and the division of this latter to form interxediate films;

FIGS. 4 and 5 illustrate the demetallization of intermediate films and cutting of said films to form individual films;

FIG. 6 is a schematic view of the stack of individual films formed on intermediate supports in order to form a plurality of mother-capacitors;

FIGS. 7 to 16 show the formation of mothercapacitors from an assembly of $n \times m$ mother-capacitors wound simultaneously in juxtaposed relation in accordance with the method of the invention;

FIG. 17 is a schematic diagram showing the principal means of an apparatus for carrying out the method in accordance with the invention.

DETAILED DESCRIPTION OF THE INVENTION

The schematic views of FIGS. 1 to 3 show a film of starting plastic material (FIG. 1), the entire film being metallized (dielectric film 1 and metallization coating 2 as shown in FIG. 2) and cut so as to form intermediate films $FI_1$, $FI_2$, etc . . . $FI_n$ by making use of conventional cutting means such as knives and the like as designated by the references $A_1$, $A_2$, $A_3$, . . . $A_{n+1}$. There is thus formed a plurality of intermediate films of substantially equal width, one advantage of the method being that the cutting operation which results in the formation of intermediate films does not call for any precision and can therefore be performed in the usual manner. It should be noted that this step of the method in which the entire surface of at least one face of the dielectric is metallized in a continuous process results in an appreciable increase in productivity by reason of the increase in width of the layer to be metallized by reason of the fact that there is no longer any problem of tolerance of border-forming and cutting tools and that the movable metallization masks which were employed in the prior art and required considerable maintenance are now dispensed with.

The operation which consists in cutting so as to form intermediate films $FI_1$, . . . $FI_n$ is carried out without any particular degree of precision in widths of the order of 50 mm. Under these conditions, the thick disks on which these films are wound can store a length of film which is substantially double the length corresponding to the individual films.

The following operations of the method in accordance with the invention are shown in FIGS. 4 and 5 and represent two possible alternative modes of execution of said method.

There is shown in FIG. 4 a first alternative embodiment or mode of execution of the operations involved in border formation, cutting into individual films, and winding of mother-capacitors on a multi-rim wheel. The operations of border formation on intermediate films such as the films FI and FJ are carried out by means of a laser beam FD which is split-up into individual demetallization laser beams $FD_1$, $FD_2$, $FD_3$, $FD_4$, FD$_5$, FD$_6$ and FD$_7$. The relative displacement of FI and FJ in front of these different laser beams results in the formation of borders M$_1$, M$_2$, ... M$_7$. By means of a cutting laser beam FC, said intermediate films are cut after demetallization by the secondary beams derived from the beam FC, that is to say respectively the beams FC$_1$, FC$_2$, FC$_3$, FC$_4$, ... FC$_{14}$. The beam FC$_1$ is intended to cut the intermediate film FI at the center of the border M$_1$ formed by the demetallization beam FD$_1$. This cut is made along the line D$_1$ and produces on the left of the line D$_1$ a portion of films NFI which will not be employed and produces an individual film FI$_1$ on the right of the line D$_1$. At the mid-point between the center of the border M$_1$ and the center of the border M$_2$, the cutting beam FC$_2$ cuts the intermediate film FI along line D$_2$ whilst the cutting beam FC$_3$ cuts the film FI at the center of the border M$_2$ forxed by the demetallization beam FD$_2$, along line D$_3$. In the same manner as described above, the borders M$_3$ and M$_4$ are formed in the case of the film FI and the cuts are made by means of the beams FC$_4$, FC$_5$, FC$_6$ and FC$_7$. Similarly, the individual films FI$_7$ to FI$_{12}$ are formed on the film FJ by demetallization with the beams FD$_5$, FD$_6$ and FD$_7$ in order to form the borders M$_5$, M$_6$ and M$_7$ followed by cutting with the beams FC$_8$, FC$_9$, FC$_{10}$, FC$_{11}$, FC$_{13}$ and FC$_{14}$ along lines D$_8$, D$_9$, ... D$_{14}$.

Another more advantageous mode of demetallization and cutting by means of the demetallization and cutting laser beams FD and FC consists of an operation as shown in FIG. 5 in which the films FI and FJ are superposed without any need to take special precautions. The demetallization beam FD is subdivided into as many secondary beams as may be necessary in order to form the borders at the required distance as a function of the width of the films FI and FJ. In FIG. 5, there are shown four demetallizing beams FD$_1$, FD$_2$, FD$_3$ and FD$_4$ which form borders respectively designated as M$_1$, M$_2$ and M'$_2$, M$_3$ and M'$_3$, M$_4$ and M'$_4$. The cutting laser beam FC is subdivided into the necessary number of secondary beams, that is, the beams FC$_1$, FC$_2$, ... FC$_7$ as shown in FIG. 5. As in the previous case, these cutting beams carry out the cutting operation at the center of the borders such as those designated by the references M$_1$, M$_2$, M'$_1$, M'$_2$ and M'$_3$, ..., namely at equal distance from the edges of said borders (cutting along lines such as D$_1$, D'$_1$, ... ). As can readily be understood, it is also possible to superpose more than two intermediate films and to proceed in the manner described above without thereby departing from the scope of the invention, provided that the beams employed have sufficient power outputs, which can be determined without any difficulty by those versed in the art.

In the case of FIG. 4 or of FIG. 5, the beams and corresponding secondary beams FC and FD will usually be stationarily fixed with well-determined and precalibrated inter-beam distances as well as an accurately predetermined relative position of the beams and the films FI and FJ will be displaced in continuous motion in front of said beams. It will be readily apparent that the displacement of said films must take place in a direction parallel to the plane defined by two corresponding secondary beams such as for example the beams FC$_1$ and FD$_1$ (as shown in FIG. 4). In order that the method may be carried out as a continuous process, it must be ensured that this direction coincides approximately with the border of the films FI and FJ.

The pairs of intermediate films thus provided with borders and cut (in accordance with the different alternative embodiments described in the foregoing) permit appreciable increases in productivity. It has accordingly been found in practice that this method makes it possible to form borders of good quality and having very small widths of the order of 0.1 to 0.2 mm, thus permitting a gain in film capacity of the order of 30% after winding.

By placing the spots of the demetallization and cutting beams close together on the corresponding intermediate film, there are no longer any problems of lateral displacement of said films with respect to the laser beams. It is thus possible to obtain films of identical width with narrow borders which are identical and uniform.

By way of example, the YAG-laser beam employed had a spot width of 400 microns and the CO$_2$-laser beam had a spot width of 200 microns, thus producing a final width of approximately 100 microns in the case of each border.

The rate of displacement of the metallized dielectric support can vary between 1 and 10 m/s according to the power outputs of the laser beams employed. For example, a CO$_2$-laser beam having a power output of 20 watts makes it possible to cut an ethylene polyterephthalate film 8 microns in thickness at a rate of 3 m/s in respect of a spot diameter of 0.3 mm and a focal distance of the order of 25 mm.

After border-formation and cutting, the different individual films FI$_1$, F$_2$, ... pass individually over rollers having axes at right angles to the axis of the film-winding wheels represented schematically in FIG. 6 by the reference numerals 10, 11, 12, 13, 14 and 15. The axes of these rollers are mounted on an adjustable micrometer system which permits accurate adjustment of the position of each of the individual films on said winding wheels. Stacking of the films is then carried out, for example by winding on large-diameter wheels such as those which are designated by the numerals 10, 11, ... 15 and which are placed in adjacent relation. By means of the adjustable micrometer system mounted on the roller over which is passed each film such as FI$_1$, FI$_2$, ..., the ends of two superposed films undergo a relative lateral displacement over the distance D$_5$ shown in FIG. 6. These films such as FI$_1$ and FI$_7$ have respectively a right-hand border and a left-hand border and are stacked with said relative lateral displacement D$_5$. The width D$_3$ of the corresponding film-winding wheel is clearly greater than the width of the mother-capacitor formed by stacking in order to leave a distance D$_4$ between the edge of the wheel 12 and the corresponding edge of a film such as the film FI$_3$. This distance D$_4$ is necessary in particular in order to permit introduction of a projecting intercalary element above each mother-capacitor as described for example in French patent No. 2,011,553.

As can readily be understood, the incidence of the laser beams on the intermediate films will preferably take place substantially in a plane at right angles to the plane of the intermediate film and parallel to the direction of travel of said film.

FIGS. 7 to 16 are schematic views of a set of n adjacent film-winding wheels on which m mother-capacitors have been stacked. The wheels J$_1$, J$_2$, ... J$_n$ are adapted to carry respectively a first mother-capacitor CM$_{11}$, CM$_{12}$, ... CM$_{1n}$, a single intercalary element I$_1$ being placed over the complete array. In this preferential embodiment of the invention, only a single intercalary element is in fact employed. This clearly has the effect of simplifying the machine employed for introducing said intercalary element and makes it possible in addition to provide better stability for the entire array of n mother-capacitors of one and the same tier, thus securing them to each other by means of this projecting intercalary element. Thus n successive tiers of mother-capacitors are formed by interposing m single intercalary elements $I_1, \ldots I_m$. The assembly of n×m mother-capacitors thus formed is spray-coated on its side faces $S_1$ and $S_n$. The m mother-capacitors located above the wheel $J_1$ and the m mother-capacitors located above the wheel $J_n$ are separated from each other by sawing, for example, along the lines $A_1, A_1$ and $A_n, A_n$ respectively. By reason of the presence of the side-face metallization coatings $S_1$ and $S_n$ respectively, these stacks of mother-capacitors are maintained in equilibrium in spite of the small width of each mother-capacitor and the substantial height of said stacks. After separation of the wheels $J_1, J_n$ from all the other wheels, the side faces $S'_1, S'_n$ of the stacks placed on the wheels $J_1, J_n$ are subjected to a spray-coating operation. Separation of the mother-capacitors located respectively on these wheels is then carried out in a manner known per se by radial sawing. FIGS. 11 to 16 show the sequence of operations performed on the set of wheels $J_2$ to $J_{n-1}$, this sequence of operations being identical with the operations described with reference to FIGS. 7 to 10 inclusive. In the case shown in FIGS. 7 to 16, the number n is equal to 6 (even number). In the event that n is an odd number, the operating sequence can be exactly as described with reference to the figures aforesaid until three adjacent stacks of m mother-capacitors are obtained. It is then necessary to separate these three stacks of mother-capacitors in order to form on the one hand a stack of m mother-capacitors which are placed on one wheel and the other side face of which is subjected to a spray-coating operation and on the other hand a second assembly of two stacks of m mother-capacitors, the side face of which has thus been bared and is also subjected to a spray-coating operation, whereupon the situation is again the same as in the previous case.

FIG. 17 is a schematic diagram showing the principal means of an apparatus for the practical application of the method in accordance with the invention. The YAG-laser beam designated as the demetallization beam FD emerges from a casing 11 provided with two screws 13 and 15 for adjusting the displacements respectively in the transverse and longitudinal directions of the assembly consisting of casing 15 and semi-reflecting mirrors 20, 21, ... 29 (this last mirror being totally reflecting) which are rigidly fixed to said casing. The distance between these mirrors as well as their orientation can be adjusted independently with respect to each other by means which are not shown in the figure. The points of impact such as $I_1$ of the demetallizing beams $FD_1, FD_2, \ldots FD_9$ (and desired number) can thus be adjusted according to requirements.

Similarly, the $CO_2$-laser beam designated as the cutting beam FC which emerges from the casing 10 is subdivided into parallel beams by means of the semi-reflecting mirrors 30, 31, 32, ... 39 (the last beam is totally reflecting). These mirrors can be adjusted independently with respect to each other by means which are not shown in the figure and are rigidly fixed to the casing 11. Displacement of the complete assembly is adjusted by the screws 12 and 14 (the adjusting screw 10 can be displaced independently of the mirrors by means not shown in the figure). The point of impact such as $I_2$ of the cutting beams such as $FC_9$ can thus be adjusted without any difficulty. The distance d between the beam impacts $I_1$ and $I_2$ is then added as indicated earlier. A plurality of films provided with borders and cut along the lines $D_1, D_2, D_3, \ldots D_9$ is thus obtained as explained in the foregoing.

What is claimed is:

1. A method of fabrication of mother-capacitors, wherein:
    (a) a mother-film of metallized plastic material is formed on at least one face of the film without any border;
    (b) the metallized mother-film is cut approximately so as to form a plurality of intermediate metallized films;
    (c) partial demetallization of each intermediate film is carried out by displacing said film in front of a YAG-laser beam divided into a plurality of secondary beams, this movement being performed in such a manner as to obtain a plurality of borders having the same width and substantially parallel to the edges of the intermediate film, the distance between said borders being substantially equal and of predetermined value;
    (d) simultaneously each intermediate film is cut so as to form indiviual films having a border and a metallized portion of predetermined width, with cutting means placed near said YAG-laser;
    (e) the individual films are moved away from each other to a predetermined distance;
    (f) n mother-capacitors are formed in juxtaposed relation by winding two intermediate films on a wheel of large diameter each intermediate film being prepared in accordance with steps a to e but with a non-metallized border located on the opposite lateral edges;
    (g) a common intercalary element is deposited on the n mother-capacitors thus formed;
    (h) there is deposited on each intercalary element fresh mother-capacitor whose edges are substantially aligned with those of the preceding tier;
    (i) m tiers of mother-capacitors are thus formed in succession;
    (j) the side faces of each assembly of m tiers of mother-capacitors are spray-coated by the Shcoop process;
    (k) and the mother-capacitors are separated from each other.

2. A method according to claim 1 wherein, after introduction of the common intercalary element, step j of the method consists in spray-coating the two apparent side faces of the assembly at the same time, then is separating two successive stacks of n mother-capacitors in a direction parallel to said spray-coated side faces so as to form two assemblies of mother-capacitors having one side face provided with a metallization coating formed by the Schoop process and one non-coated side face, then in spray-coating the other side face of each assembly, finally in repeating the two preceding steps of cutting and spray-coating if necessary in order to obtain n assemblies of m mother-capacitors in which both of the side faces have been spray-coated.

3. A method according to claim 2, wherein step d which consists in cutting the intermediate film so as to form individual films is carried out by means of a $CO_2$-laser beam subdivided into individual beams.

4. A method according to claim 3, wherein the laser beams for demetallization and cutting of the intermediate films are located substantially in a plane at right angles to the plane of the intermediate film and parallel to the direction of travel of said film.

* * * * *